No. 817,089. PATENTED APR. 3, 1906.
W. NICHOLSON, Jr.
TUBE EXPANDER.
APPLICATION FILED SEPT. 15, 1905.
FIG_1_
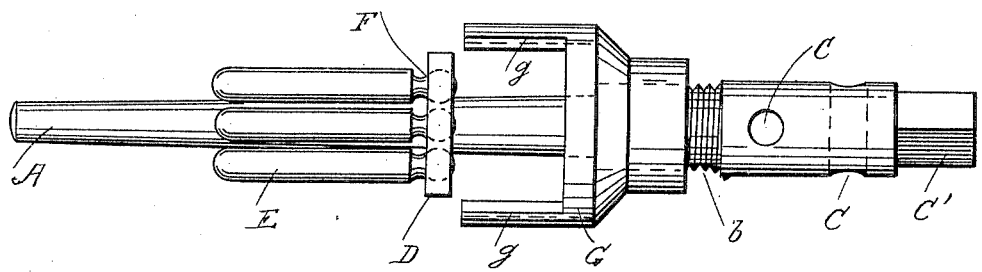
FIG_2_
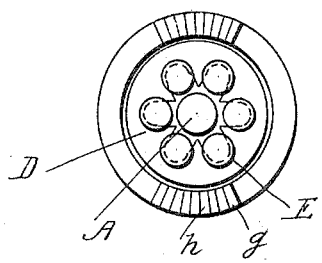
FIG_3_
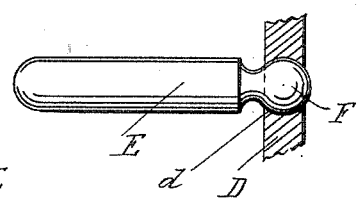
FIG_4_
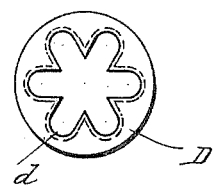
FIG_5_
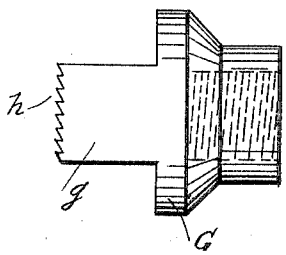
FIG_6_
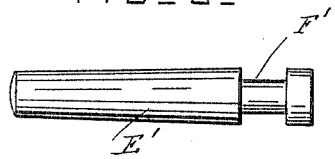
FIG_7_
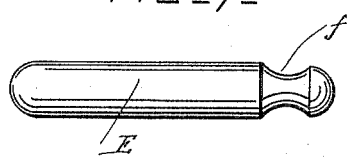
WITNESSES:
J Smgg Poole
Robt A. Cissel
INVENTOR
William Nicholson Jr.
BY
Herbert W. Jenner.
Attorney

UNITED STATES PATENT OFFICE.

WILLIAM NICHOLSON, JR., OF WILKES-BARRE, PENNSYLVANIA, ASSIGNOR TO WM. H. NICHOLSON & CO., OF WILKES-BARRE, PENNSYLVANIA, A FIRM.

TUBE-EXPANDER.

No. 817,089.  Specification of Letters Patent.  Patented April 3, 1906.

Application filed September 15, 1905. Serial No. 278,643.

*To all whom it may concern:*

Be it known that I, WILLIAM NICHOLSON, Jr., a citizen of the United States, residing at Wilkes-Barre, in the county of Luzerne and State of Pennsylvania, have invented certain new and useful Improvements in Tube-Expanders; and I do hereby declare the following to be a full, clear, and exact description of the invention, such as will enable others skilled in the art to which it appertains to make and use the same.

This invention relates to expanders for the tubes of boilers and other similar pipes; and it consists in the novel construction and combination of the parts hereinafter fully described and claimed.

In the drawings, Figure 1 is a side view of the tube-expander. Fig. 2 is an end view of the tube-expander. Fig. 3 is a detail view of one of the rollers, showing a portion of the retaining-disk in section. Fig. 4 is a detail view of the retaining-disk. Fig. 5 is a detail side view of the releasing-collar. Fig. 6 is a detail view of a roller, showing a modification. Fig. 7 shows a second modification of one of the rollers.

A is a tapered arbor or spindle provided at its larger end with a screw-threaded portion b. The arbor has also holes C in its larger end portion and terminates in a rectangular portion C'. These holes and the rectangular or square part are for the purpose of applying tools for revolving the arbor.

D is a retaining-disk which is slidable over the tapered arbor and which is provided with a series of radial slots or sockets d.

E represents expanding-rollers provided at one end portion with bearings F, which are journaled freely in the said slots or sockets, so that the rollers can move freely to a limited extent in all directions. The bearings F are preferably ball-shaped, and the sockets d are undercut in spherical form, so that the rollers are connected to the disk by universal joints.

G is the releasing-collar which is screwed upon the screw-threaded portion b of the arbor. This collar is provided with two projecting arms g, having serrations h on their ends.

The rollers E' may be formed tapering, as shown in Fig. 6, instead of being parallel, as shown in Fig. 3, and the rollers may have parallel necks F', which are loosely journaled in the slots of the retaining-disk, if desired.

The rollers E or E' may also have rounded necks f, if desired, as shown in Fig. 7, instead of having globular or spherical shaped ends or parallel necks.

Any desired number of rollers may be used, and it is preferable to use as many rollers as the size of the tubes to be expanded will permit. The rollers are placed in the end portion of the tube and the tapered arbor is revolved and pressed into the tube. The frictional contact of the parts causes the rollers to be inclined so that the arbor is self-feeding. The position of the releasing-collar is adjusted by revolving it on the arbor. When the arms of the collar strike the flue-sheet of the boiler, the serrations engage with the flue-sheet and the arbor is backed out, thereby releasing the rollers from engagement with the tube and permitting the tool to be withdrawn with facility. The release of the rollers is brought about by the left-hand arrangement of the screw-threads on the arbor, the said arbor being preferably revolved to the right. If, however, the arbor is to be revolved to the left, the screw-threads are cut to the right, so as to effect the release of the rollers at the desired point. The releasing-collar also operates as a gage, so that all the tubes are expanded equally.

What I claim is—

1. In a tube-expander, the combination, with a tapered arbor provided with a screw-threaded portion, of a slidable retaining-disk, a series of expanding-rollers for engaging the tube, said rollers being carried by the said disk around the said arbor, and a releasing-collar engaging with the said screw-threaded portion and provided with means for engaging the tube-plate whereby the said collar is held stationary.

2. In a tube-expander, the combination, with a tapered arbor having a screw-threaded portion at its larger end, of a retaining-disk slidable on the said arbor, a series of expanding-rollers carried by the said disk, and a releasing-collar engaging with the said screw-threaded portion and provided with arms which project longitudinally over the tapering part of the arbor.

3. In a tube-expander, the combination, with a tapered arbor provided with a screw-threaded portion at its larger end, of a retaining-disk slidable on the arbor and provided with a series of radial slots, a series of expanding-rollers provided with bearings which are journaled in the said slots, and a releasing-collar engaging with the said screw-threaded portion and provided with arms which project longitudinally over the tapering part of the arbor.

4. In a tube-expander, the combination, with a tapered arbor provided with a screw-threaded portion, of a slidable retaining-disk, a series of expanding-rollers for engaging the tube, said rollers being connected with the said disk by ball-and-socket joints, and a releasing-collar engaging with the said screw-threaded portion and provided with means for engaging the tube-plate whereby the said collar is held stationary In testimony whereof I have affixed my signature in the presence of two witnesses.

WILLIAM NICHOLSON, Jr.

Witnesses:
GEORGE NICHOLSON,
A. L. TURNER.